United States Patent [19]

Dahl

[11] 4,053,881
[45] Oct. 11, 1977

[54] MOBILE RADAR APPARATUS

[75] Inventor: David Dahl, Ski, Norway

[73] Assignee: Lehmkuhl A/S, Oslo, Norway

[21] Appl. No.: 632,716

[22] Filed: Nov. 17, 1975

[51] Int. Cl.² ............................................. G01S 7/22
[52] U.S. Cl. ............................................... 343/5 EM
[58] Field of Search ........................ 343/5 EM, 5 DP

[56] References Cited

U.S. PATENT DOCUMENTS

| | | | |
|---|---|---|---|
| 2,688,130 | 8/1954 | Whitaker et al. | 343/5 EM |
| 3,060,427 | 10/1962 | Jaffe et al. | 343/5 EM |
| 3,648,283 | 3/1972 | Busch et al. | 343/5 EM |

Primary Examiner—Maynard R. Wilbur
Assistant Examiner—Richard E. Berger
Attorney, Agent, or Firm—Young & Thompson

[57] ABSTRACT

A device for a mobile radar apparatus connected to a gyro compass for indicating the true course on a radar screen, where pulses from the radar and the gyro are counted, and upon a pulse signal representing the straight-ahead-position of the radar antenna the counting of the gyro pulses are read into the radar pulse counter which continues counting until a set reference pulse number, upon which a pulse train is released for indication of the desired bearing line on the radar screen.

4 Claims, 1 Drawing Figure

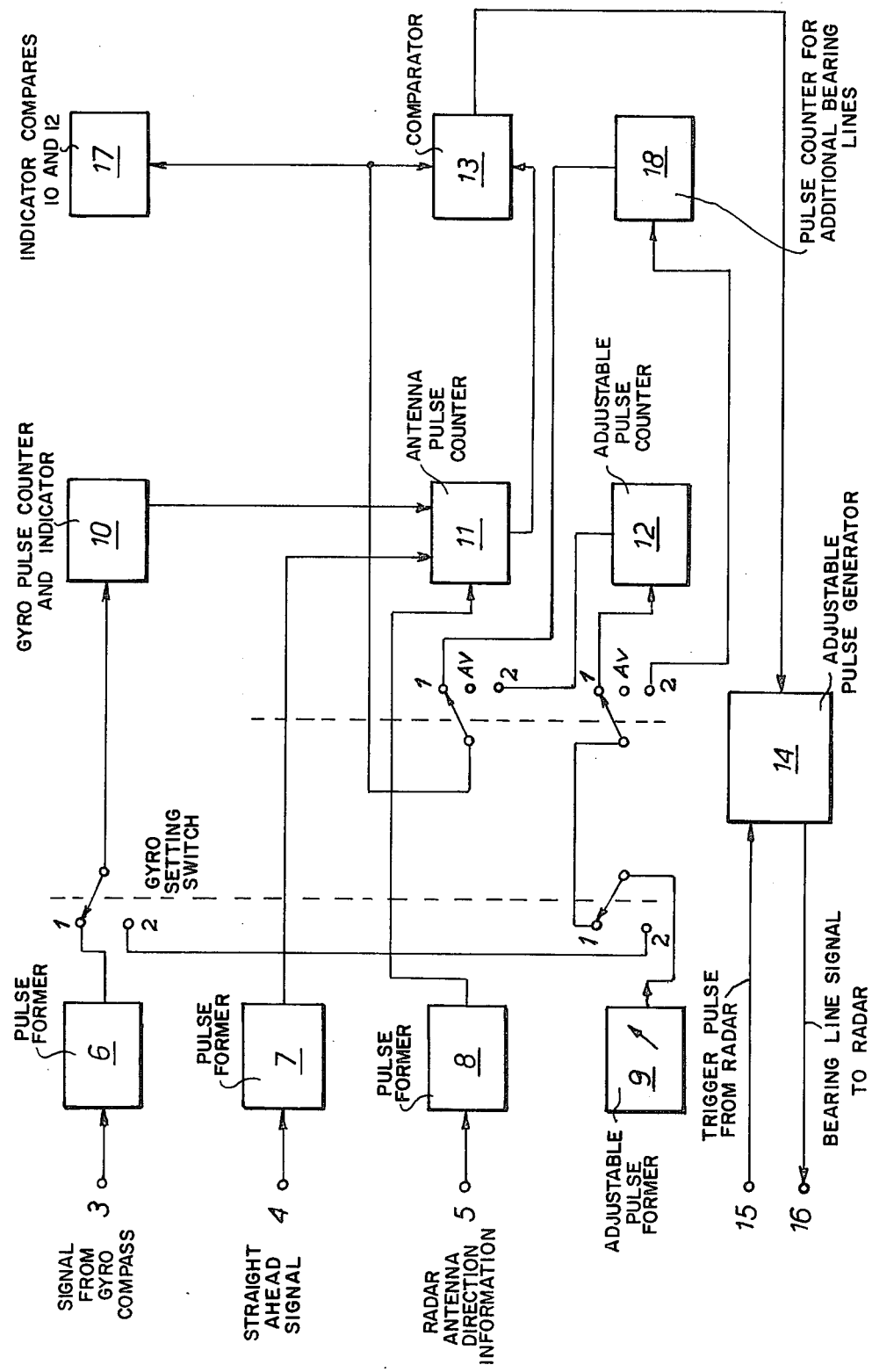

MOBILE RADAR APPARATUS

The invention relates to an improvement in a mobile radar apparatus connected to a gyro compass for indicating the true course on a radar screen.

The purpose of the invention is to provide a device which, in connection with such radar apparatus indicates on the radar screen an adjustable bearing line in order, at any time, to be able, for example, to compare the position of another ship in relation to the bearing line and thereby to ones own direction.

This is achieved according to the invention by the direction information signals from the radar antenna and the gyro compass being converted in their respective pulse formers to pulses which are supplied respectively to their pulse counters, and that a third pulse counter is adjustable to the desired counting value by means of pulses from an adjustable pulse generator, and in that a pulse signal representing the radar antenna's straight ahead position effects the reading in of the counting value in the pulse counter and the indicator for the gyro compass in the pulse counter for information direction signals, which continues counting until it reaches the set counting value in a third pulse counter, whereby a pulse train is released which causes indication of a desired set bearing line on the radar screen.

Additional features in the invention will be evident from the following description.

An embodiment example of the invention will be described below more in detail with reference to the drawing which shows a block diagram for a device according to the invention.

In the device according to the embodiment an information signal from a gyro compass is fed by way of terminal 3 to a pulse former 6 which converts the information signal into a pulse signal with one pulse per degree. Via a gyro-setting switch these pulses are supplied to a pulse counter and indicator 10 which counts from 0 to 359, that is to say 360°. The radar antenna direction information is supplied by means of a terminal 5 to a pulse former 8 which converts the information signal into a pulse signal which is supplied to a pulse counter 11 which counts from 0 to 359. A signal which represents the straight ahead position of the radar antenna is supplied via a terminal 4 to a pulse former 7 which converts this information into a pulse signal which sets the pulse counter 11 to the reading of the gyro counter 10. The pulse counter 11 then continues counting. A pulse generator 9 with adjustable pulse repetition frequency delivers by way of the gyro setting switch a pulse signal which is supplied to a pulse counter 12 which counts from 0 to 359, for the setting of the angle for the desired bearing.

The counting value in the pulse counters 11 and 12 is compared in a comparator 13 which by coincidence delivers a control pulse to an adjustable pulse generator 14 which by way of a terminal 15 is supplied with a trigger pulse from the radar and delivers a bearing line signal to the radar video amplifier via a terminal 16. The count value in the pulse counter 12 is supplied to a digital indicator 17 for comparison with a digit indication in the pulse counter and the indicator 10 for gyro course. Only one bearing line at a time is thus displayed.

If a second bearing line is desired, a pulse counter 18 may be arranged which is fed from the pulse generator 9 and which alternately via a direction finder switch may be indicated in the form of a dotted bearing line on the radar screen. The counter 12 will store its count value and if switched in again the bearing line will reappear on its original bearing. Thus the apparatus has a memory and stores the latest count value or bearing to which each of the counters 12 and 18 is set.

Having described my invention, I claim:

1. Improvement in a mobile radar apparatus having a gyro compass for indicating the true course on a radar screen, characterized in that information direction signals from a radar antenna (5) and a gyro compass (3) are converted in pulse formers (8 and 6 respectively) to pulses which are supplied to pulse counters (11 and 10 respectively) and that a third pulse counter (12) is adjustable to the desired counting value by means of pulses from an adjustable pulse generator (9), and that a pulse signal which represents the radar antenna straight-ahead-position causes the reading in of the counting value in the pulse counter (10) for the gyro compass in the pulse counter (11) for direction information signals and which continues counting until it reaches the counting value set in the third pulse counter (12), whereupon a pulse train is released which causes indication of a desired set bearing line on the radar screen.

2. A device according to claim 1, characterized by at least one additional pulse counter (18) with adjustable counting value for alternate or simultaneous indication of at least one additional bearing line on the radar screen.

3. A device according to claim 1, characterized by a digital indicator (17) which gives the gyro course in degree and one or more of the desired bearing courses.

4. A device according to claim 1, characterized in that the pulse train repetition frequency is adjustable to the radar range scale in such a way that the bearing line is a dotted line.

* * * * *